UNITED STATES PATENT OFFICE 2,104,726

PRODUCTION OF HYDROHALIDES OF ALKYL ESTERS OF ISO-QUINOLINE ALKALOIDS

Carl R. Addinall, Westfield, and Randolph T. Major, Plainfield, N. J., assignors to Merck & Co., Inc., Rahway, N. J., a corporation of New Jersey No Drawing. Application May 17, 1934, Serial No. 726,122

9 Claims. (Cl. 260—25)

The present invention relates to the production of a new series of hydrohalides of various alkyl esters of certain iso-quinoline alkaloids of the general structure:—

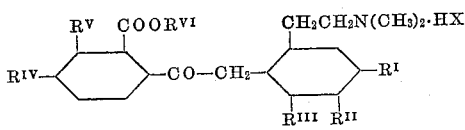

wherein $R^I$, $R^{II}$, $R^{III}$, $R^{IV}$, and $R^V$ are H, or an alkoxy or part of an alkylene oxy-radical attached to the benzene nuclei, X is an acid radical, and $R^{VI}$ is an alcohol radical; of the type of narceine and methyl-hydrasteine, and their substituted derivatives, and to processes for the production of hydrohalides of their akyl esters generally. Another object is the production of such a series of hydrohaloid salts by direct derivation from narcotine and its analogous alkaloid hydrastine.

The methyl and ethyl esters have previously been prepared by direct esterification of narceine [Freund & Frankforter, Annalen, 277, 31 (1893),] but the prior art, so far as revealed by a careful survey of the literature, does not show that any of the higher alkyl esters of narceine or methyl hydrasteine have been produced hitherto and, indeed, it does not appear that any of the processes previously employed for methyl and ethyl esterification of narceine [Freund & Frankforter, Annalen, 277, 31, 1893] are suitable for the preparation of the corresponding iso-propyl and butyl esters of narceine or methyl-hydrasteine.

The present process provides a suitable and efficient means for production of hydrohalides of a wide series of alkyl and substituted alkyl esters by application of the new process to the alkaloids, narcotine and hydrastine, instead of by direct esterification of narceine and methyl-hydrasteine, respectively.

In general, the process consists of treating the methyl halides of these alkaloids of the iso-quinoline type by refluxing them with the alcohol required for the specific esterification in the presence of a suitable acid or basic catalyst, as will further hereinafter appear.

The method of employing our process, the resulting reaction, and the type of products obtained are illustrated in the graphic formulae herewith presented:

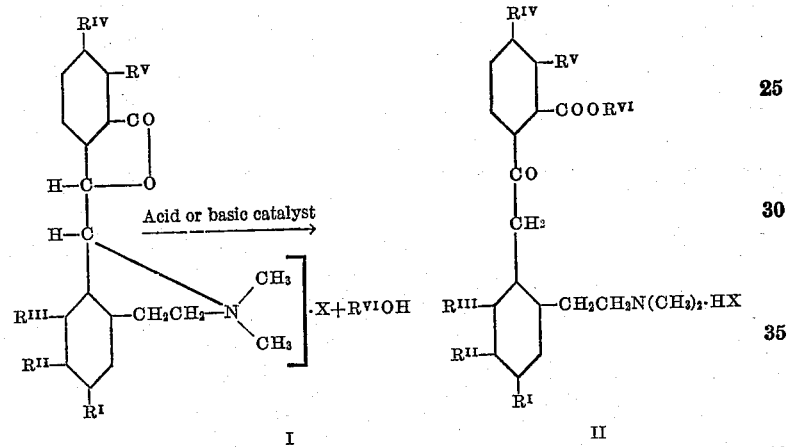

In these formulae $R^I$, $R^{II}$, $R^{III}$, $R^{IV}$, and $R^V$ are H, or an alkoxy or part of an alkylene oxy-radical attached to the benzene nuclei, X is an acid radical, and $R^{VI}$, is an alcohol radical.

The compounds of formula I are dissolved in the required alcohol, e. g., ethyl, propyl, isopropyl, butyl, or amyl. To avoid known side reactions, i. e., the formation of the corresponding free bases and/or amino compounds, the alcohol should preferably contain but little water, say not in excess of about 5%. The solution is refluxed for several hours in the presence of the selected catalyst, which, for obvious reasons, should be substantially anhydrous.

The choice of the catalyst, which may be either acid or basic, will be controlled by considerations as will further appear. It should be an electrolyte which is soluble in the required alcohol for the particular esterification and has a pH substantially between that of sodium ethylate and of salicylic acid in said alcohol.

Among the acids which may be used as catalytic agents are the following:

| Acid | Formula | K×10⁻⁵ |
|---|---|---|
| Boric | $H_3BO_3$ | 0.00007 |
| p-Aminobenzoic | $H_2NC_6H_4CO_2H$ | 1.2 |
| Proprionic | $CH_3CH_2CO_2H$ | 1.32 |
| Acetic | $CH_3CO_2H$ | 1.85 |
| Cinnamic | $C_6H_5CH=CHCO_2H$ | |
| Phenyl acetic | $C_6H_5CH_2CO_2H$ | 5.4 |
| Benzoic | $C_6H_5CO_2H$ | 6.52 |
| Salicylic | $HOC_6H_4CO_2H$ | 106.0 |

It has not been found possible, however, to isolate crystalline material in runs made with the following acids as catalysts:

| Acid | Formula | K×10⁻⁵ |
|---|---|---|
| Monochloracetic | $ClCH_2CO_2H$ | 160.0 |
| Oxalic | $(CO_2H)_2$ | 3,800.0 |
| Dichloracetic | $Cl_2CHCO_2H$ | 5,000.0 |
| Trichloracetic | $Cl_3CCO_2H$ | 300,000.0 |

Such bases may be used as catalytic agents as possess a degree of basicity similar to that existing in the alcoholic solutions containing ammonium, sodium, and potassium ions and also alcoholic solutions of such organic bases as pyridine and quinoline for example, ammonia gas (in absolute alcohol); sodium ethylate (in absolute alcohol); sodium acetate (in absolute alcohol); ammonium iodide, (in absolute alcohol); potassium iodide (in absolute alcohol); pyridine, and quinoline.

The general applicability of the reactions of the process described was shown by the preparation of various salts of alkyl esters of narceine and methyl-hydrasteine. Thus, among others, we have produced such compounds as the methyl esters of narceine hydrochloride, hydroiodide, and metho-sulphate; the ethyl esters of narceine hydrochloride and hydriodide; the propyl, iso-propyl, butyl, and amyl esters of narceine hydroiodide, and hydrochloride; the ethyl ester of methyl-hydrasteine hydrochloride, and the like; as well as corresponding salts of various other substituted alkyl esters of narceine and methyl-hydrasteine.

Typical compounds prepared by appropriate adaptation of the processes outlined herein and their physical constants are shown in the following tabulation:—

Esters of narceine hydrohalides

| Formula | M. P. °C. | Form |
|---|---|---|
| $C_{23}H_{26}(CH_3)NO_8HI$ | 211–212 | Pale yellow prisms |
| $C_{23}H_{26}(CH_3)NO_8HCl$ | 154–155 | Water-white prismatic crystals |
| $C_{23}H_{26}(CH_3)NO_8CH_3HSO_4$ | 213–214 | Water-white crystals |
| $C_{23}H_{26}(C_2H_5)NO_8HI$ | 212–213 | Water-white rhomboidal platelets |
| $C_{23}H_{26}(C_2H_5)NO_8HCl$ | 208–210 | Water-white prismatic crystals |
| $C_{23}H_{26}(n-C_3H_7)NO_8HI$ | 218–220 | Water-white long prismatic needles |
| $C_{23}H_{26}(n-C_3H_7)NO_8HCl$ | 234–236 | Water-white microscopic prisms |
| $C_{23}H_{26}(Iso\ C_3H_7)NO_8HI$ | 224–225 | Yellow crystalline powder |
| $C_{23}H_{26}(Iso\ C_3H_7)NO_8HCl$ | 234–235 | Water-white prismatic crystals |
| $C_{23}H_{26}(C_4H_9)NO_8HI$ | 185–186 | Pale yellow crystalline powder |
| $C_{23}H_{26}(C_4H_9)NO_8HCl$ | 236–237 | Water-white microscopic crystals |
| $C_{23}H_{26}(n-C_5H_{11})NO_8HI$ | 237–238 | White rhomboidal platelets |
| $C_{23}H_{26}(n-C_5H_{11})NO_8HCl$ | 244–246 | White truncated rhomboidal platelets |
| $C_{22}H_{24}(C_2H_5)NO_7HI$ | 235–236 | Yellow rhomboidal platelets |
| $C_{22}H_{24}(C_2H_5)NO_7HCl$ | 214–215 | Water-white prismatic crystals |

The hydriodides of these bases are soluble in cold water, and readily soluble in hot water, while the hydrochlorides are soluble to 1–5% in water at room temperature.

The process has also been applied to the production of the corresponding hydrohalide salts of propyl, iso-propyl, butyl and amyl esters of methyl-hydrasteine.

The following examples illustrate the process and general application of the principle and mechanism of the invention to the production of the series described by appropriate adaptation of the required alcohol and catalyst:

EXAMPLE I

*Conversion of narcotine methyl iodide into the ethyl ester of narceine hydriodide*

2 grams narcotine methyl idide, 30 cc. absolute ethyl alcohol, and 0.2–0.5 gram of catalytic acid were warmed to solution in a 100 cc. flask united to an upright condenser provided with a guard tube. The material was refluxed over the steam bath for 40 hours. After long standing crystalline masses separated out from the various reaction mixtures and the crystals were recrystallized from boiling ethyl alcohol. The crystalline material went into solution very slowly and after standing for some time recrystallized in hard layers on the bottom of the flask as though from a pre-formed heavy oily layer. After several recrystallizations the ethyl ester of narceine hydriodide was obtained. It occurred in the form of long rhomboidal plates with truncated corners. All samples melted at 212–3°; and no melting point depression was obtained on testing various mixed samples.

EXAMPLE II

*Conversion of hydrastine methiodide into the ethyl ester of methyl-hydrasteine hydriodide*

Hydrastine methiodide was refluxed with absolute ethyl alcohol in a stream of ammonia for four hours. The crude crystalline material formed on the concentration of the solution was recrystallized three times from boiling water. It contained halogen and was difficult to burn. The ethyl ester of methyl-hydrasteine hydriodide was obtained. It occurred in the form of yellow rhomboidal platelets having a melting point of 235–236°.

Example III

*Conversion of narcotine methyl iodide into the ethyl ester of narceine hydriodide*

5 grams sodium acetate were added to the orange solution of 10 grams narcotine methiodide in ethyl alcohol. The salt went into solution accompanied by a change of color to a pale lemon. The solution was refluxed for four hours in an all glass apparatus provided with a CaCl₂ guardtube. The lemon yellow liquid was concentrated to one-half its volume over the steambath. On cooling, a pasty mass of crystals was formed which were filtered off, and washed with cold ethyl alcohol. The crude crop was twice recrystallized from hot 95% alcohol. The ethyl ester of narceine hydriodide occurred in the form of glittering glass-clear crystals which, under the microscope, proved to be long rhombic needles having a melting point of 211-2°. The material gave a positive Beilstein test and its aqueous solution gave a yellow precipitate with AgNO₃. The crystals agree in all respects with the hydriodide of narceine ethyl ester.

Example IV

*Conversion of narcotine ethyl iodide into ethyl ester of narceine hydriodide (alternative)*

10 grams narcotine methiodide (M/55), 100 cc. absolute ethyl alcohol and 0.2 gram sodium (M/115) were refluxed for four hours under conditions similar to those described in Example III and the solution became more orange than that of the iodide in alcohol. Treatment as described gave fine crystals identical in all respects to those resulting in Example III. The orange coloration remains in the mother liquor and disappears on acidification with glacial acetic acid. The color is doubtlessly that of the sodium salt of narceine or its quarternary ammonium salt.

Example V

*Conversion of narcotine methyl methosulfate into methyl ester of narceine methosulfate*

Narcotine methyl methosulfate, produced by heating six grams of narcotine with two grams of dimethyl sulfate in a stoppered flask over a steam bath, was dissolved in 100 ccs. of absolute methyl alcohol and refluxed for six hours in a stream of dry ammonia under conditions similar to those previously described. The material formed on cooling was recrystallized from hot methyl alcohol and yielded the methyl ester of narceine methosulfate in the form of water-white crystals having a melting point of 213–214° C.

We claim as our invention:—

1. A process for producing hydrohalides of various alkyl esters of iso-quinoline alkaloids of the general formula:

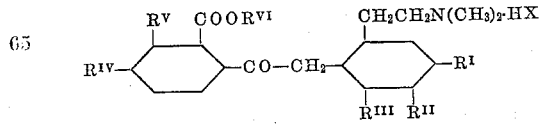

wherein $R^I$, $R^{II}$, $R^{III}$, $R^{IV}$, and $R^V$ may be selected from the group consisting of H and alkoxy radicals, and wherein adjacent pairs together may be an alkylene-oxy radical, attached to the benzene nuclei; X is a mineral acid radical, and $R^{VI}$ is an alkyl radical; which comprises refluxing the methyl halides of the corresponding alkaloids of the general formula:

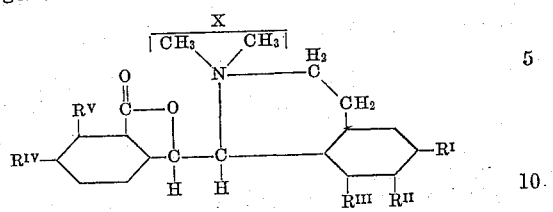

with the desired alcohol in the presence of a suitable ring-cleavage catalyst, comprising an electrolyte soluble in said alcohol and having a pH between that of sodium ethylate and of salicylic acid in said alcohol.

2. A process for producing hydrohalides of various alkyl esters of iso-quinoline alkaloids of the general formula:

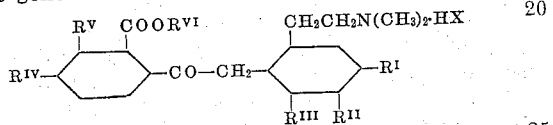

wherein $R^I$, $R^{II}$, $R^{III}$, $R^{IV}$, and $R^V$ may be selected from the group consisting of H and alkoxy radicals, and wherein adjacent pairs together may be an alkylene-oxy radical, attached to the benzene nuclei; X is a mineral acid radical, and $R^{VI}$ is an alkyl radical; which comprises refluxing the methyl halides of the corresponding alkaloids of the general formula:

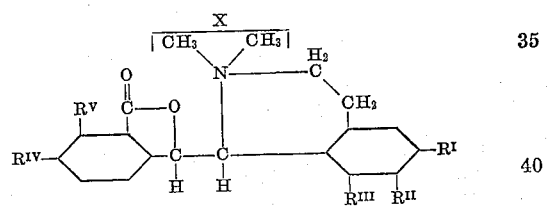

with the desired alcohol in the presence of a suitable acid catalyst, comprising an electrolyte being soluble in said alcohol with a pH substantially as described.

3. A process for producing hydrohalides of various alkyl esters of iso-quinoline alkaloids of the general formula:

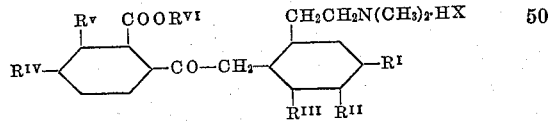

wherein $R^I$, $R^{II}$, $R^{III}$, $R^{IV}$, and $R^V$ may be selected from the group consisting of H and alkoxy radicals, and wherein adjacent pairs together may be an alkylene-oxy radical, attached to the benzene nuclei; X is a mineral acid radical, and $R^{VI}$ is an alkyl radical; which comprises refluxing the methyl halides of the corresponding alkaloids of the general formula:

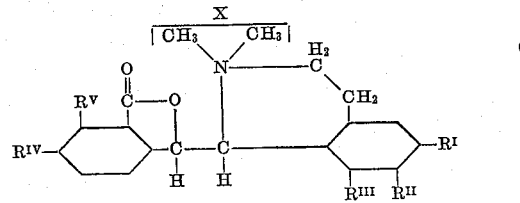

with the desired alcohol in the presence of a suitable basic catalyst, comprising an electrolyte being soluble in said alcohol with a pH substantially.

4. A process for producing alkyl esters of narceine hydrohalides from narcotine methyl halides which comprises dissolving narcotine methyl iodide in substantially absolute alkyl alcohol, in the presence of a small amount of a ring-cleavage catalyst comprising an electrolyte being soluble in said alcohol with a pH substantially as described, and prolonged heating of the mixture over a steam bath.

5. A process for producing the ethyl ester of narceine hydriodide from narcotine methyl iodide which comprises dissolving 2 parts narcotine methyl iodide, 30 parts absolute ethyl alcohol, and 0.2–0.5 of a ring-cleavage catalyst comprising an electrolyte being soluble in said alcohol with a pH substantially as described, prolonged refluxing of the mixture over a steam bath, and recrystallizing the reaction product.

6. A process for producing the methyl ester of narceine hydriodide from narcotine methyl iodide which comprises adding 5 parts sodium acetate to a solution of 10 parts narcotine methiodide in alcohol, refluxing said solution, cooling, and subsequently recrystallizing the reaction product.

7. A process for producing the methyl ester of narceine hydriodide from narcotine methyl iodide which comprises refluxing a solution of 10 parts narcotine methiodide, 100 parts alcohol, and 0.2 part sodium, cooling said solution, and subsequently recrystallizing the reaction product.

8. Alkyl esters of certain iso-quinoline alkaloids of the narceine type of the general structure:

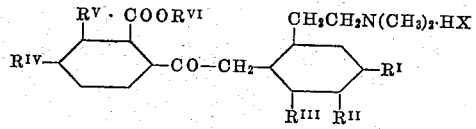

wherein $R^I$, $R^{II}$, $R^{III}$, $R^{IV}$, and $R^V$ may be selected from the group consisting of H and alkoxy radicals and wherein adjacent pairs together may represent an alkylene-oxy radical attached to the benzene nuclei, X is a mineral acid radical; and $R^{VI}$ is an alkyl radical having more than two atoms of carbon.

9. The propyl ester of narceine hydriodide of the formula $C_{23}H_{26}(n\text{—}C_3H_7)NO_8HI$, having a melting point of 218–220°, and occurring in the form of water-white long prismatic needles.

CARL R. ADDINALL.
RANDOLPH T. MAJOR.